(12) United States Patent
Stockmann et al.

(10) Patent No.: US 10,603,670 B2
(45) Date of Patent: Mar. 31, 2020

(54) GRANULATOR

(71) Applicant: Thermo Electron (Karlsruhe) GmbH, Karlsruhe (DE)

(72) Inventors: Erich Stockmann, Vahingen an der Enz (DE); Thobias Geissler, Bruchsal (DE)

(73) Assignee: Thermo Electron (Karlsruhe) GMBH, Karlsruhe (DE)

( * ) Notice: Subject to any disclaimer, the term of this patent is extended or adjusted under 35 U.S.C. 154(b) by 1299 days.

(21) Appl. No.: 14/351,106

(22) PCT Filed: Dec. 18, 2012

(86) PCT No.: PCT/EP2012/005221
§ 371 (c)(1),
(2) Date: Apr. 10, 2014

(87) PCT Pub. No.: WO2013/091827
PCT Pub. Date: Jun. 27, 2013

(65) Prior Publication Data
US 2014/0263790 A1    Sep. 18, 2014

(30) Foreign Application Priority Data

Dec. 21, 2011    (DE) .................. 10 2011 121 972

(51) Int. Cl.
*B02C 18/16*    (2006.01)
*B02C 18/14*    (2006.01)
(Continued)

(52) U.S. Cl.
CPC ............ *B02C 18/16* (2013.01); *B02C 18/148* (2013.01); *B29B 9/06* (2013.01); *B02C 2018/162* (2013.01); *B02C 2018/2208* (2013.01)

(58) Field of Classification Search
CPC . B02C 18/0097; B02C 18/0007; B02C 18/16; B02C 18/145; B02C 18/148;
(Continued)

(56) References Cited

U.S. PATENT DOCUMENTS 3,419,223 A * 12/1968 Morin ................... B02C 18/144
                                                    241/285.3
3,837,586 A *  9/1974 Perschbacher ........ B02C 18/148
                                                    198/780

(Continued)

FOREIGN PATENT DOCUMENTS

CN      101190421 A     6/2008
CN      201096150       8/2008
(Continued)

OTHER PUBLICATIONS

Examination Report dated Jan. 17, 2019, to IN Patent Application No. 3731/DELNP/2014.

*Primary Examiner* — Adam J Eiseman
*Assistant Examiner* — Matthew Kresse
(74) *Attorney, Agent, or Firm* — William R McCarthy, III

(57) ABSTRACT

The invention relates to a granulator having a cutting device which is driven by a drive device and to which a material strand can be supplied, for example by means of a conveying device. The drive device is accommodated in a granulator housing. The cutting device and optionally also the conveying device are arranged in a separate module housing, which is connected in a detachable manner to the granulator housing and can be removed from same. The cutting device and/or the conveying device are connected to the respective drive device via detachable couplings. The cutting device and optionally also the conveying device can be removed from the granulator housing as a unit together with the module housing.

11 Claims, 4 Drawing Sheets

Figure 1:
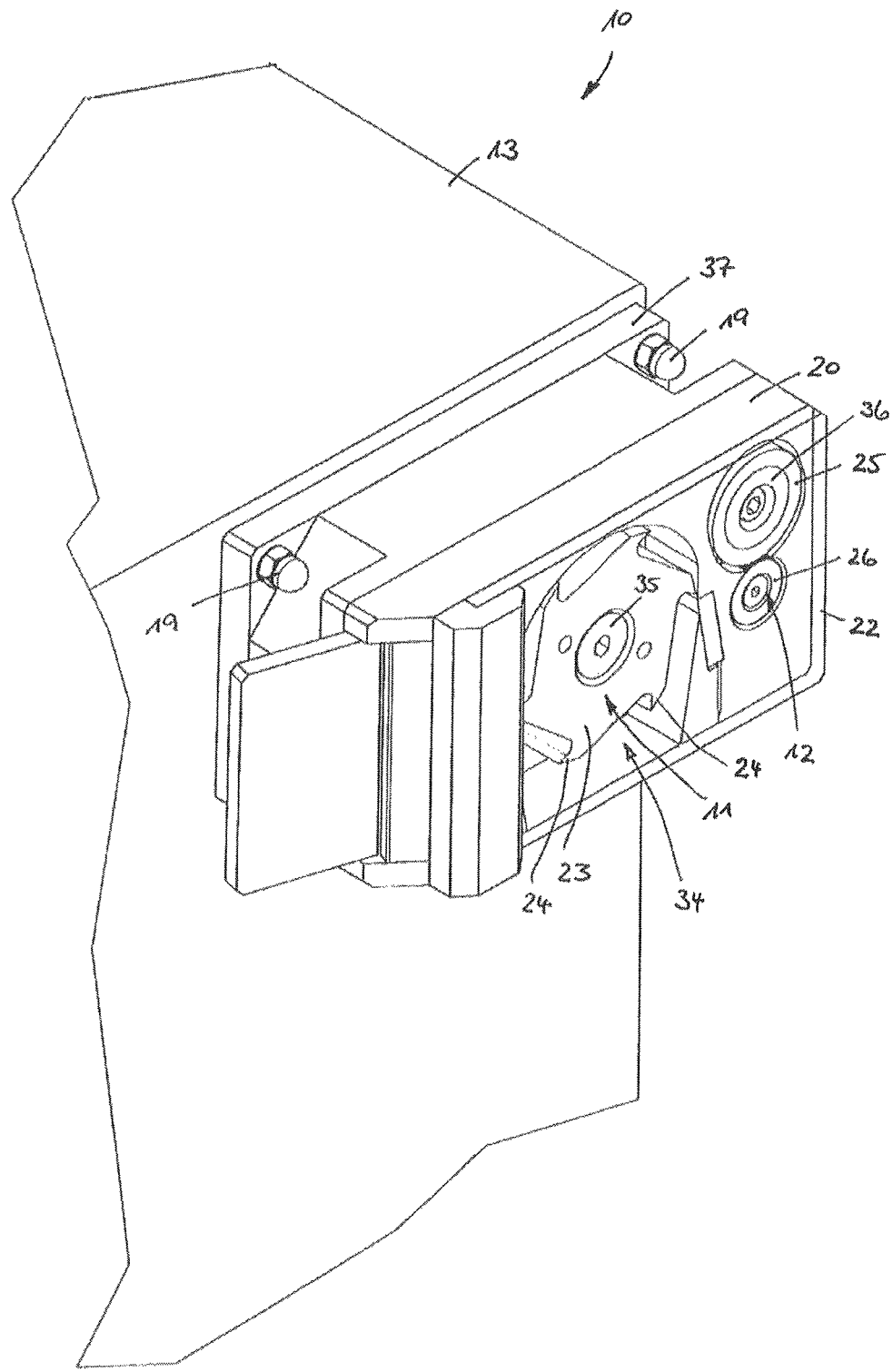

(51) Int. Cl.
    *B29B 9/06*     (2006.01)
    *B02C 18/22*     (2006.01)

(58) Field of Classification Search
    CPC .............. B02C 23/02; B02C 2018/162; B02C
                  2018/0046; B29C 31/042; B29C 33/72;
                  B29C 47/0002; B29C 47/0818
    USPC ........................................... 241/285.1, 285.2
    See application file for complete search history.

(56) References Cited

U.S. PATENT DOCUMENTS

| | | | | |
|---|---|---|---|---|
| 4,061,282 A * | 12/1977 | Walker | ................. | B02C 18/144 |
| | | | | 241/222 |
| 4,453,676 A * | 6/1984 | Arnaldo | ................. | B02C 18/148 |
| | | | | 241/101.2 |
| 5,048,764 A | 9/1991 | Flament | | |
| 5,211,093 A | 5/1993 | Horniak | | |
| 5,595,770 A | 1/1997 | Pirrung et al. | | |
| 5,628,465 A * | 5/1997 | Locker | ................. | B02C 18/148 |
| | | | | 241/34 |
| 5,996,457 A | 12/1999 | Wingeron, Jr. | | |
| 7,270,285 B2 | 9/2007 | Roberts | | |
| 8,496,463 B2 * | 7/2013 | Oravits | ................ | B29C 47/1054 |
| | | | | 366/76.5 |
| 8,851,408 B2 * | 10/2014 | Bihn | ......................... | B02C 4/06 |
| | | | | 241/230 |
| 2007/0221766 A1 * | 9/2007 | Karlsson | ................. | B02C 18/16 |
| | | | | 241/73 |
| 2010/0032507 A1 * | 2/2010 | Chen | ................... | B02C 18/0007 |
| | | | | 241/34 |
| 2012/0223169 A1 * | 9/2012 | Pan | ..................... | B02C 18/0007 |
| | | | | 241/101.2 |
| 2012/0223172 A1 * | 9/2012 | Pan | ..................... | B02C 18/0007 |
| | | | | 241/220 |
| 2014/0042254 A1 * | 2/2014 | Zhan | ................... | B02C 18/0007 |
| | | | | 241/34 |

FOREIGN PATENT DOCUMENTS

| | | |
|---|---|---|
| DE | 3941836 | 9/1990 |
| DE | 202010000512 U1 | 8/2011 |
| GB | 655185 | 7/1951 |
| GB | 703956 | 2/1954 |
| GB | 770704 | 3/1957 |
| GB | 2271741 | 4/1994 |
| JP | 246602 U1 | 3/1990 |
| JP | 0839547 A | 2/1996 |

* cited by examiner

GRANULATOR

The invention relates to a granulator having a cutting device driven by a drive device, wherein the drive device is accommodated in a granulator housing and the cutting device is accommodated in a module housing which is detachably connected to the granulator housing and is removable therefrom, and wherein the cutting device is connected to the drive device via a releasable coupling.

A granulator serves to cut up a material strand, which can consist, for example, of extruded plastic, into small pieces, since the material can thereby be better transported and stored. The material strand can be constituted by a so-called endless strand if the strand issuing directly from an extruder is fed to the granulator. By the term "material strand" should also be understood, however, strand-like portions of an endless material strand and bar-shaped material pieces.

In the granulator, the material strand is cut at its front end by means of the cutting device, which can be constituted by a rotating blade or a blade which can be moved alternately back and forth, into small pieces, which usually fall directly downward into a receiving container and are collected therein. The cutting device is connected via a drive shaft to a drive device which is seated in the granulator housing.

In order to obtain granules of the desired size, the material strand must be fed at a defined velocity to the cutting device. For this purpose, a conveying device, which has a rotationally driven drive wheel and a pressure roller, between which a material strand is passed, is usually provided in the granulator. The drive wheel is connected via a shaft to a drive device, which is likewise disposed within the granulator housing.

U.S. Pat. No. 7,270,285 B2 discloses a granulator which has a cutting device, driven by a drive device, in the form of a rotating blade wheel, wherein the drive device is accommodated in a granulator housing. In addition, a housing-like bearing plate, which receives the blade wheel disposed between the bearing plate and the granulator housing, is provided. Onto the bearing plate, on the side facing away from the blade wheel, a cover can be mounted.

A granulator also finds application in branches of production in which very high hygiene requirements prevail, for example in the manufacture of foods or pharmaceuticals. If, on a granulator, a change of product is to be made, i.e. if, instead of a material strand of a first material, a material strand of another, second material is now to be processed, it must be ensured that no remnants of the previously processed first material, which could contaminate the granules of the second material, are present in the granulator. For this purpose, it is known that the granulator, in the event of a change of product, must first be fully cleaned. If very high hygiene requirements are placed on the processing of the respective materials, it is necessary to completely disassemble the cutting device and the conveying device, to clean them remote from the previous site and then to reassemble them at the site. This leads to very long downtimes of the granulator, which is very uneconomical.

In order to disassemble the cutting device according to U.S. Pat. No. 7,270,285 B2 for cleaning purposes, the cover must first be removed. Next a central motor shaft and fastening screws are loosened, so that the bearing plate, the blade wheel and the granulator housing come free from one another. The bearing plate and the blade wheel are here respectively loose, so that there is the danger that these parts fall off and pollute the environment with cutting residues. Moreover, cutting residues seated on the bearing plate or on the blade wheel can fall off, which likewise leads to pollution of the environment. Furthermore, the installation effort involved in the disassembly and subsequent assembly is relatively large and thus cost-intensive.

The object of the invention is to provide a granulator of the stated type, in which a change of product can be achieved in a quick and easy manner without danger of contaminating the environment with cutting residues.

This object is achieved according to the invention by a granulator having the features of claim 1. It is here provided that the cutting device is removable together with the module housing, as a unit, from the granulator housing.

The invention is based on the fundamental idea of configuring the cutting device as an independent, modular structural unit, which has a separate module housing attachable to the granulator housing, wherein the cutting device is connected to its drive device via the coupling. In the event of a change of product, the module housing, together with the cutting device which is accommodated in the module housing and forms a unit therewith, is detached from the granulator housing, with release of the coupling, and can then be cleaned. At the same time, a new module housing of same construction, i.e. inclusive of a cutting device, can be attached to the granulator housing, the cutting device being connected to its drive device via the coupling. The granulator can thus continue to remain in operation while the previously used and detached module housing, with the cutting device, is cleaned. The downtimes of the granulator can thereby be kept very short.

In a preferred embodiment of the invention, it is provided that, in addition to the cutting device, a conveying device which is driven by a drive device and with which the material strand to be cut can be fed to the cutting device is also provided, wherein the conveying device can likewise be accommodated in the module housing and detached together with the latter, as a unit, from the granulator housing. Preferably, the conveying device is connected to its drive device via a releasable coupling.

For the cutting device and the conveying device, a common drive device can be provided, though the cutting device and the conveying device preferably respectively possess a dedicated drive device.

In a preferred embodiment of the invention, it is provided that all components which come into contact with the material strand are in or on the module housing. It is thereby ensured that any product remnants of the processed product can be found only in or on the module housing and are reliably removed if the module housing is detached.

In one possible embodiment of the invention, it is provided that the conveying device has a rotationally driven drive wheel and a pressure roller, between which the material strand is transportable. Preferably, the pressure roller is tensioned against the drive wheel under spring load, so that good transmission of the drive force to the material strand is guaranteed. The spring load on the pressure roller can here be adjustable and hence adaptable to different materials.

In order to guarantee good force transmission between the peripheral surface of the drive wheel and the material strand, in a refinement of the invention it can be provided that the drive wheel has a structuring, for example a knurling, on its peripheral surface.

The cutting device can be constituted by a rotationally driven cutting wheel, for example having a rotational axis running perpendicular to the longitudinal axis of the material strand, wherein the cutting wheel can have a plurality of cutting teeth distributed over the periphery. It is also possible, however, for the cutting device to be formed from a blade which is moved linearly back and forth and which is preferably disposed vertically above or beneath that end of the material strand which is to be cut.

In order to avoid a situation in which, during the cutting of the material strand, product remnants find their way into the environment, in a preferred embodiment of the invention it can be provided that the cutting device and/or the conveying device are accommodated in an interior of the module housing, which interior is closable by means of a cover. The cover can be constituted, for example, by a door or lid, which in particular, at least in some sections, can be of transparent design in order that a user can view and monitor the operation and the correct functioning of the conveying device and of the cutting device.

In a refinement of the invention, it can be provided that the cover or that opening of the module housing which is covered by the cover is disposed on that side of the module housing which is facing away from the couplings, and is thus also arranged facing away from the granulator housing. The conveying device and the cutting device are as far as possible encapsulated in the module housing and closed off from the environment. A small-sized aperture is provided only for the inlet of the material strand and, where necessary, an outlet opening can be configured for the cut-off particles, i.e. the granules. Should it be necessary to open the cover, its orientation facing away from the granulator housing serves to ensure that a pollution of the granulator housing, and/or of the couplings, with product remnants is very unlikely.

As the coupling between the cutting device or the conveying device and the respective drive device, any coupling which guarantees good force transmission from the drive device to the cutting device or conveying device and which, moreover, is easily releasable can be used. In a preferred embodiment of the invention, a plug-in coupling is used. The releasable coupling of the conveying device thus has at least one, and preferably at least two engaging pins, which can respectively be inserted with a preferably tight fit into a corresponding receptacle. By means of the engaging pin or engaging pins, a torque can be transmitted in a simple manner.

The releasable coupling of the cutting device can also have at least one, and preferably at least two engaging pins, which can respectively be introduced into a corresponding receptacle.

In order to facilitate an exact positioning of the module housing relative to the granulator housing, and hence also a simple and exact introduction of the engaging pins into the respective receptacle, in a refinement of the invention it can be provided that at least one of the couplings has a centering pin, which can be introduced into a centering receptacle.

Figure 2:
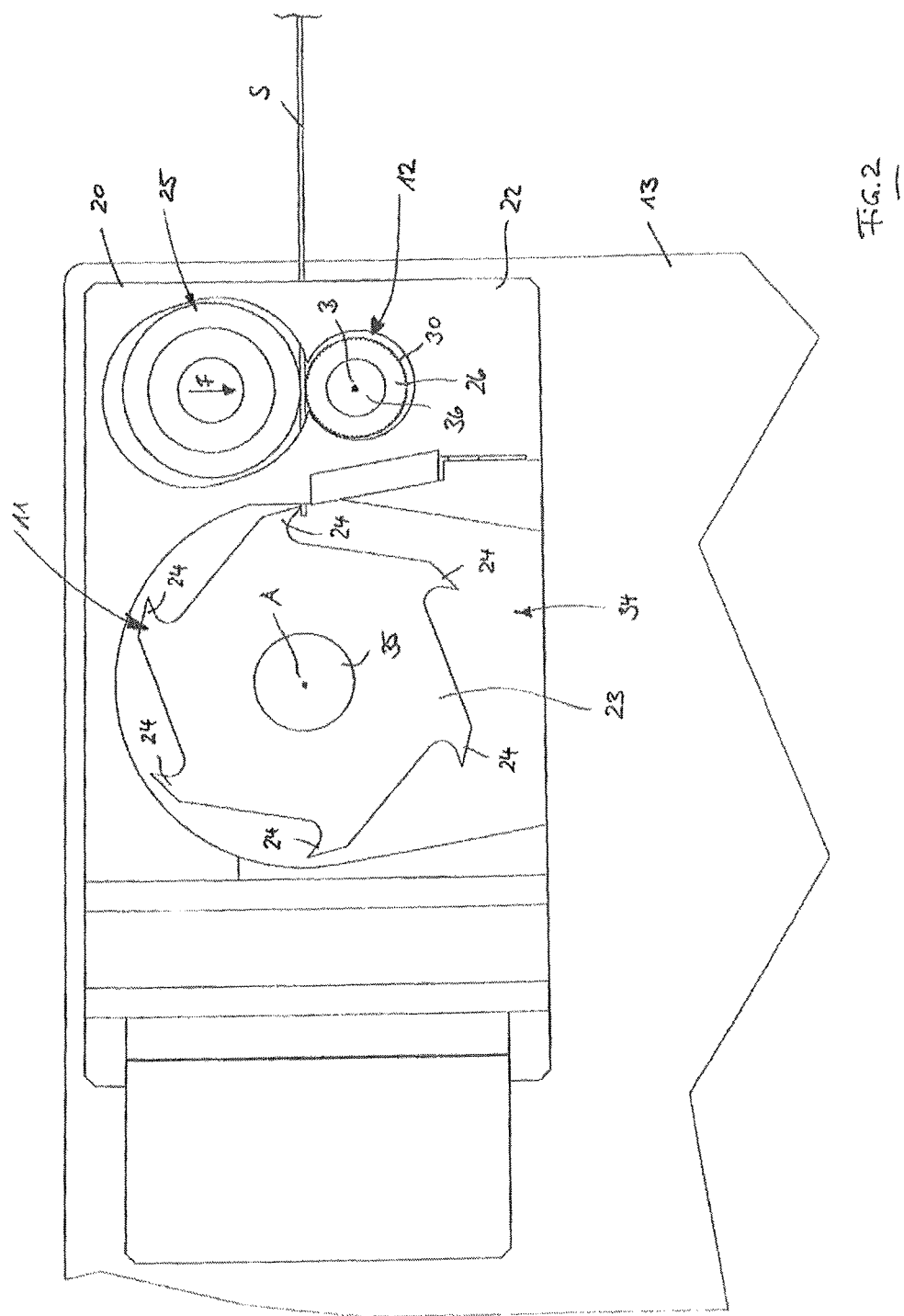
Figure 3:
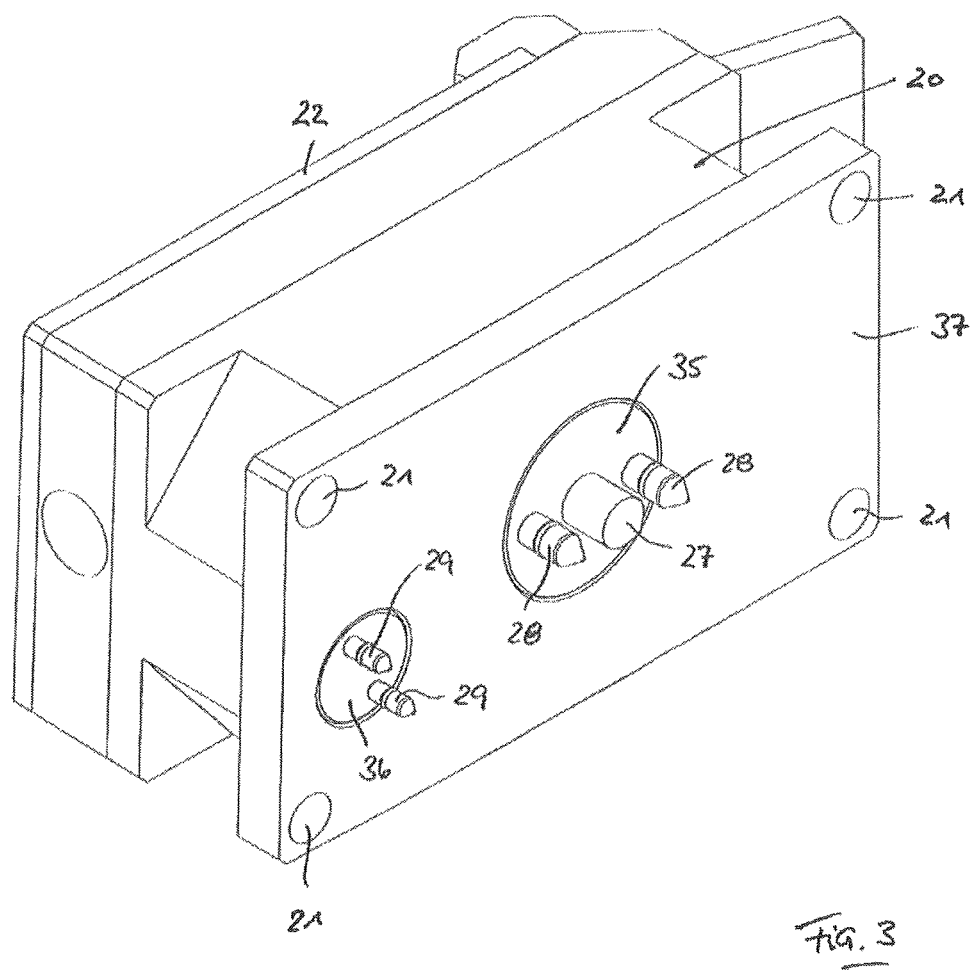
Figure 4:
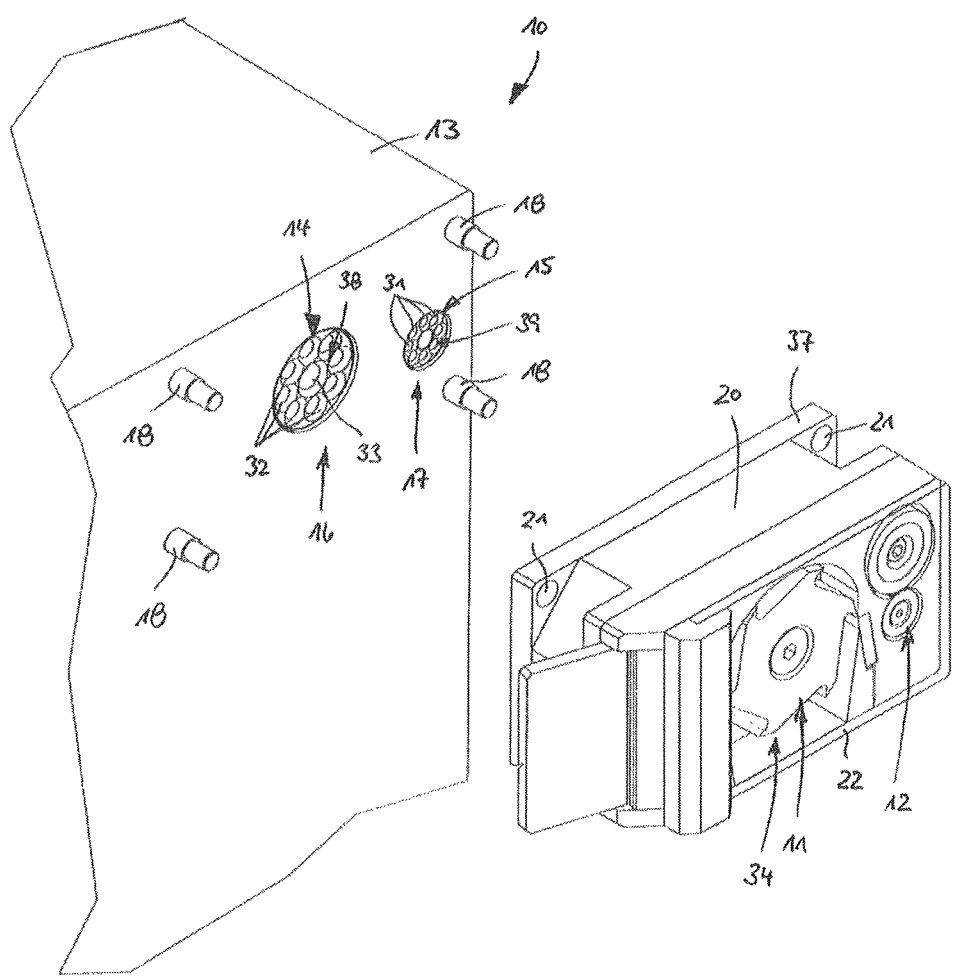

Further details and features of the invention can be seen from the following description of an illustrative embodiment with reference to the drawing, wherein:

FIG. 1 shows a partial perspective representation of a granulator, with mounted module housing, FIG. 2 shows a front view of the module housing, FIG. 3 shows a perspective rear view of the module housing, and FIG. 4 shows a representation corresponding to FIG. 1, with removed module housing.

A granulator 10 represented in the figures possesses a granulator housing 13, and a module housing 20 which is attachable thereto and detachable therefrom. In the module housing 20 is configured an interior 34, in which a cutting device 11 is disposed. The cutting device 11 comprises a cutting wheel 23, which possesses a plurality of cutting teeth 24 arranged distributed over the periphery. The cutting wheel 23 is seated on a shaft 35, which is rotatable about an axis A.

In addition, in the module housing 20 is disposed a conveying device 12. The conveying device 12 comprises a drive wheel 26, which on its peripheral surface possesses a structuring 30 in the form of a knurling and is seated on a shaft 36 mounted rotatably about an axis B. In the represented illustrative embodiment, the axes A and B run parallel to each other.

The conveying device 12 further comprises a rotatably mounted pressure roller 25, which, by means of a spring force indicated only schematically by an arrow F, is tensioned against the drive wheel 26.

As FIG. 2 shows, a material strand S can be introduced between the drive wheel 26 and the pressure roller 25 and clamped between these two components. If the drive wheel 26 is rotated, the material strand S is hence conveyed in its longitudinal direction and fed to the cutting device 11, which at the front end of the material strand S cuts off a piece from the material strand S and thus granulates the latter.

The interior 34 of the module housing 20 can be closed by means of a door or lid-like cover 22, which in the represented illustrative embodiment is transparent.

On the rear side, facing away from the cover 22, of the module housing 20, the latter possesses a back plate 37, which in its corner regions is provided with bores 21, into which correspondingly arranged retaining pins 18, fastened to the granulator housing 13, can be introduced.

As FIG. 3 shows, the shaft 35 of the cutting device 11 penetrates the back plate 37 and ends at the rear substantially flush with this same. At the rear end of the shaft 35 are configured a central centering pin 27 and two drive pins 28 which are laterally offset thereto and protrude in the axial direction of the shaft 35.

The shaft 36 of the conveying device 12 also penetrates the back plate 37 and ends at the rear substantially flush with this same. Formed onto the shaft 36 are two drive pins 29, which protrude rearward in the axial direction of the shaft 36.

According to FIG. 4, a drive device 14 for the cutting device 11 is disposed in the granulator housing 13, wherein of the drive device 14 only the end of a drive shaft 38 is represented, which drive shaft possesses on its outer end face a central centering receptacle 33, as well as a plurality of hole-like receptacles 32 distributed over the periphery. The drive shaft 38 forms, in cooperation with the centering pin 27 and the drive pins 28 of the shaft 35 of the cutting device 11, a releasable coupling 16, with which a torque can be transmitted.

In the granulator housing 13, moreover, is disposed a drive device 15 for the conveying device 12, of which only the front-face end of a drive shaft 39 can be seen, on the front-face end of which are configured a plurality of hole-shaped receptacles 31, which are arranged distributed over the periphery and which, in cooperation with the drive pins 29 of the shaft 36 of the conveying device 12, form a releasable coupling 17, with which a torque can be transmitted.

For the installation of the module housing 20, this is mounted with its back plate 37 onto the retaining pins 18 of the granulator housing 13 in such a way that the retaining pins 18 reach through the bores 21 of the back plate 37 of the module housing 20. At the same time, the centering pin 27 of the shaft 35 is introduced into the centering receptacle 33 of the drive shaft 38 and the drive pins 28 of the shaft 35 are inserted into two diametrically opposing receptacles 32 of the drive shaft 38. The drive shaft 38 is thus operatively connected to the shaft 35 of the cutting device 11, so that a torque can be transmitted.

At the same time, the drive pins 29 of the shaft 36 of the conveying device 12 are introduced into two diametrically opposing receptacles 31 of the drive shaft 39, so that the coupling 17 between the drive shaft 39 and the shaft 36 of the conveying device 12 is also connected for the transmission of a torque. If the module housing 20 is correctly positioned on the granulator housing 13, nuts 19 are screwed onto the protruding retaining pins 18 in order to fix the module housing 20.

For the exchange or detachment of the module housing 20, the nuts 19 are loosened and the module housing 20 is removed, together with all attachment parts disposed in the module housing 20, in particular the cutting device 11 and the conveying device 12, as a unit from the retaining pins 18. Also the coupling 16 between the drive device 14 and the cutting device 11, as well as the coupling 17 between the drive device 15 and the conveying device 12, are here released. This state is represented in FIG. 4. The previously used module housing can then be taken to an external cleaning site, while, at the same time, a new module housing is attached to the granulator housing in the stated manner, so that another material strand can be processed.

The invention claimed is:

1. A granulator system, comprising:
   a granulator housing comprising a first drive shaft and a second drive shaft; and
   a module housing encapsulating a cutting device and a conveying device within an interior of the module housing, wherein the cutting device and the conveying device are configured to produce granules of a desired size from a material strand;
   wherein the module housing comprises a first plug-in coupling and a second plug-in coupling configured to release the module housing from the granulator housing and wherein the first plug-in coupling engages the cutting device with the first drive shaft, and the second plug-in coupling engages the conveying device with the second drive shaft.

2. The granulator system as claimed in claim 1, wherein the conveying device has a rotationally driven drive wheel and a pressure roller, between which the material strand is transportable.

3. The granulator system as claimed in claim 2, wherein the pressure roller is tensioned against the drive wheel under a spring load.

4. The granulator system as claimed in claim 3, wherein the spring load on the pressure roller is adjustable.

5. The granulator system as claimed in claim 2, wherein the drive wheel has a structuring on a peripheral surface.

6. The granulator system as claimed in claim 1, wherein the cutting device has a rotationally driven cutting wheel having a plurality of cutting teeth distributed over a peripheral surface.

7. The granulator system as claimed in claim 1, wherein the interior of the module housing is closable by means of a cover.

8. The granulator system as claimed in claim 7, wherein the cover is disposed on a side of the module housing which is facing away from the first and second plug-in couplings.

9. The granulator system as claimed in claim 1, wherein the first plug-in coupling comprises at least one engaging pin associated with the cutting device and a receptacle associated with the first drive shaft.

10. The granulator system as claimed in claim 1, wherein the second plug-in coupling comprises at least one engaging pin associated with the conveying device and a receptacle associated with the second drive shaft.

11. The granulator system as claimed in claim 1, wherein at least one of the first or second plug-in couplings comprises a centering pin and a centering receptacle.

\* \* \* \* \*